Sept. 25, 1934.    S. SCHNETZER ET AL    1,974,665
FABRICATED STRUCTURE
Filed June 20, 1932

INVENTORS
SIEGFRIED SCHNETZER.
THOMAS H. HUFF.
BY
Toulmin & Toulmin
ATTORNEYS

Patented Sept. 25, 1934

1,974,665

UNITED STATES PATENT OFFICE 1,974,665

FABRICATED STRUCTURE

Siegfried Schnetzer, Bear Creek, Md., and Thomas H. Huff, Montclair, N. J., assignors to General Aviation Corporation, Dundalk, Md., a corporation of Maryland Application June 20, 1932, Serial No. 618,284

3 Claims. (Cl. 189—34)

This invention relates to improvements in structural materials, and has for its object to provide a structural element composed of some suitable sheet material forming a plurality of overlaid plain sheets with an intervening corrugated sheet between adjacent plain sheets.

It is an object of this invention to provide a structural element composed of thin sheets of relatively small structural strength, welded at intervals to an intermediate diagonally disposed corrugated member, likewise formed of a thin sheet of relatively small structural strength, thereby forming a very strong but at the same time very light structural member.

It is a further object to provide such a structural member, in which the corrugations are angularly arranged and the ends of which are spaced, preferably from the ends of the inclosing sheets, which may be turned over or otherwise formed, to form passageways communicating with the ends of the passageways between the corrugations of the interior sheet. In this manner spaces are formed between the cover sheets for inclosing fire-proofing material, soundproofing material or material which is to be circulated therethrough for cooling, radiation or other purposes.

The structure of our invention is particularly adapted for use with non-ferrous metals such as the alloys of aluminum, in order to form structures for airplanes, automobiles and the like, which can be light, strong and if desired, insulated for noise, vibration, fire, heat, etc., or used in connection with circulatory systems for radiation, oil cooling, etc.

It is a further object of this invention to provide a structural material consisting of a diagonally corrugated strip of metal, or other suitable material, and a wrapper therefor consisting of a strip of metal looped along one edge of the corrugated strip and extending over the sides thereof, and welded or otherwise suitably attached to the sides with the lateral edges bent adjacent the other edge of the corrugated strip, thereby forming a complete closure or wrapper for the corrugated strip.

These and other advantages will appear from the following description taken in connection with the drawing.

Referring to the drawing.

Figure 5:
Figure 5 is a section on the line 5—5 of Figure 3.
Figure 6:
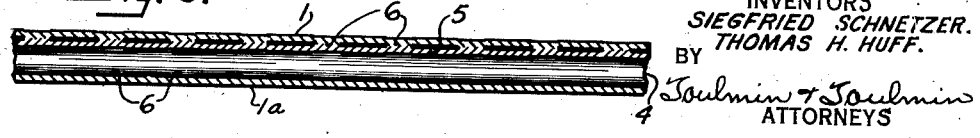
Figure 6 is a section on the line 6—6 of Figure 3.

This fabricated structure or building material is composed of two parts, an outer cover composed of a strip of metal, or some other suitable material, bent to form an upper side 1, and a lower side 1a, spaced one from the other. The loop connection between these two sides is indicated by the numeral 2. The other and second part of the structural unit or fabricated structure consists of a corrugated strip 4, located between the sides 1 and 1a, with one edge adjacent the loop 2. The other edge is inclosed by the lateral edges of the cover strip being bent toward each other, as clearly shown by the numeral 3 in Figure 5. These lateral edges contact and may be welded, but not necessarily so.

Figure 1:
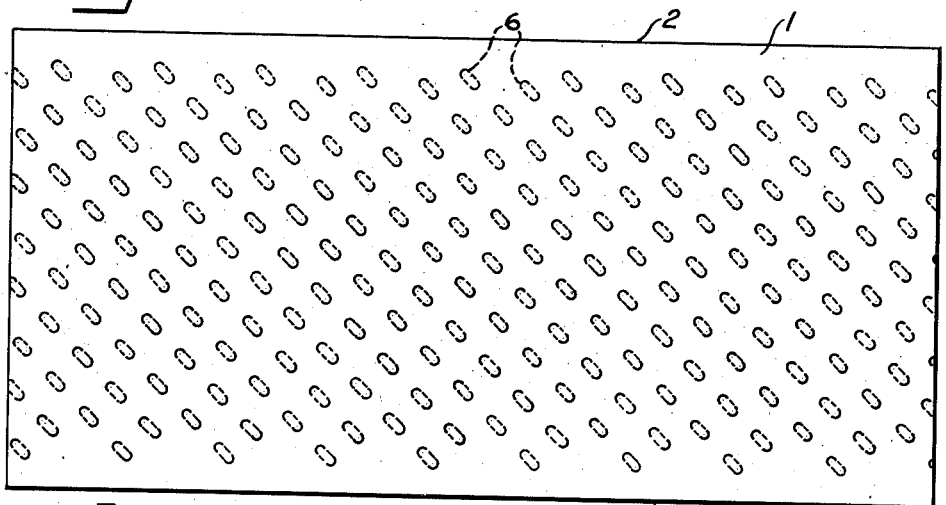
Figure 1 is a top plan view of applicants' fabricated structure.
Figure 2:
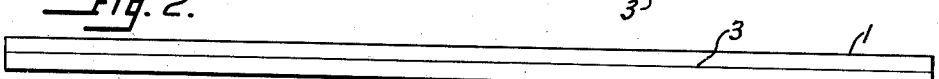
Figure 2 is a view looking at one edge of the structure shown in Figure 1.
Figure 3:
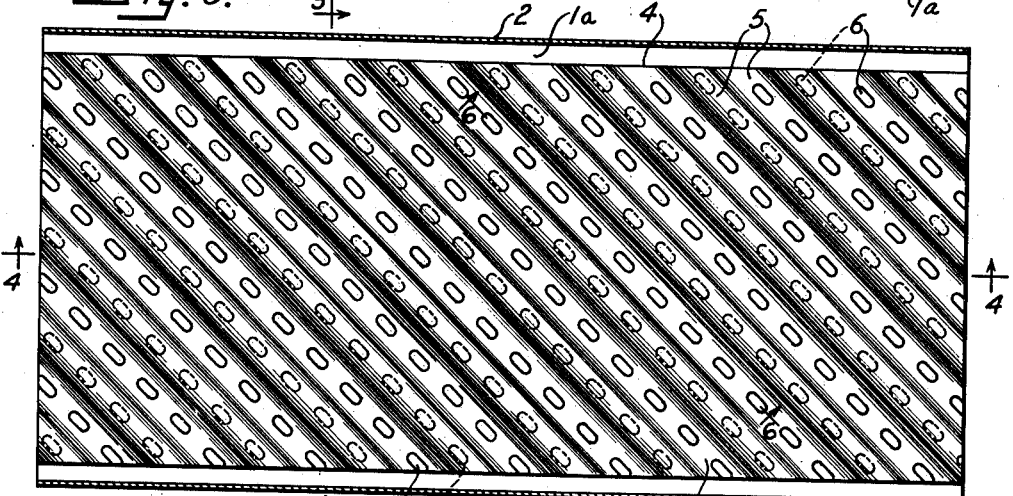
Figure 3 is a longitudinal, transverse section with one side of the cover removed to show the corrugated interior strip.
Figure 4:
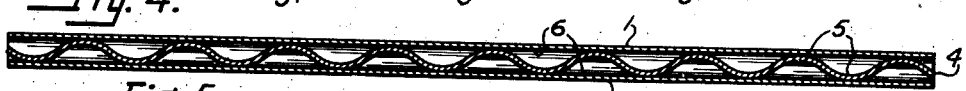
Figure 4 is a section on the line 4—4 of Figure 3.

The corrugated strip has corrugations 5, alternating one with the other, and engaging the sides 1 and 1a. These corrugations are attached to the sides by means of spot welds 6. The corrugations as shown are diagonally disposed across the corrugated strip, but may be varied as to angularity and position. The points where the corrugations are welded to the strips form with each other straight lines, or straight rows, as shown in Figure 1.

The building unit or fabricated structure, according to the present invention, is rigid, light, easily manufactured and well adapted for use in connection with airplane construction. In order to make the fabricated structure heat-resisting, the space between the corrugated sheet or strip and the side strip may be filled with some insulating or non-conducting material.

When these spaces are completely filled with some heat insulating material, heat would be conducted from one side of the structure to the other side with difficulty, because the space between the two sides is almost completely filled with the heat-insulating material. The direct metal connection would be along one part of the corrugated strip for some distance, thereby rendering it very difficult for heat to be conveyed from one side of the finished building strip or fabricated structure to the other.

It will be understood that we desire to comprehend within our invention such modifications as come within the scope of our claims and our invention.

Having thus fully described our invention, what we claim as new and desire to secure by Letters Patent, is:

1. A structural unit consisting of a continuous metal sheet folded to form spaced parallel plane portions, and an internal metal stiffening member arranged therebetween and united thereto, said stiffening member consisting of a metal sheet having corrugations diagonally disposed relative to at least one edge of said structural unit.

2. A structural unit consisting of a continuous metal sheet folded to form spaced parallel plane portions, and an internal metal stiffening member arranged therebetween and united thereto, the space containing said member being enclosed by the folded portion along one edge, said stiffening member consisting of a metal sheet having corrugations diagonally disposed relative to at least one edge of said structural unit.

3. A structural unit consisting of a continuous metal sheet folded to form spaced parallel plane portions with the free edges of said sheet bent to substantially engage one another and form an enclosure in cooperation with the folded portion thereof, and an internal metal stiffening member arranged therebetween and united thereto, said stiffening member consisting of a metal sheet having corrugations diagonally disposed relative to at least one edge of said structural unit.

SIEGFRIED SCHNETZER.
THOMAS H. HUFF.